United States Patent
Lewis et al.

(10) Patent No.: US 10,498,839 B2
(45) Date of Patent: *Dec. 3, 2019

(54) PROVIDING SUPPLEMENTAL CONTENT IN RELATION TO EMBEDDED MEDIA

(71) Applicant: Google Inc., Mountain View, CA (US)

(72) Inventors: Justin Lewis, Marina Del Ray, CA (US); Jonathan William Ray, Venice, CA (US)

(73) Assignee: GOOGLE LLC, Mountain View, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/728,463

(22) Filed: Oct. 9, 2017

(65) Prior Publication Data

US 2018/0034925 A1  Feb. 1, 2018

Related U.S. Application Data

(63) Continuation of application No. 14/076,741, filed on Nov. 11, 2013, now Pat. No. 9,787,783.

(60) Provisional application No. 61/833,407, filed on Jun. 10, 2013.

(51) Int. Cl.
*H04L 29/08* (2006.01)

(52) U.S. Cl.
CPC .................... *H04L 67/20* (2013.01)

(58) Field of Classification Search
CPC ....................................... H04L 67/20
USPC ......................................... 709/217
See application file for complete search history.

(56) References Cited

U.S. PATENT DOCUMENTS

| | | | |
|---|---|---|---|
| 2002/0073179 A1* | 6/2002 | Mackintosh | H04H 20/02 709/219 |
| 2008/0183742 A1* | 7/2008 | Kapur | G06F 16/951 |
| 2009/0133071 A1 | 5/2009 | Sakai et al. | |
| 2010/0119208 A1* | 5/2010 | Davis | H04N 5/765 386/291 |
| 2011/0041168 A1* | 2/2011 | Murray | G06Q 30/02 726/7 |
| 2011/0246495 A1* | 10/2011 | Mallinson | G06Q 30/02 707/758 |
| 2012/0030586 A1* | 2/2012 | Ketkar | G06Q 30/0269 715/751 |
| 2012/0054275 A1* | 3/2012 | Channell | G06Q 30/0278 709/204 |

(Continued)

FOREIGN PATENT DOCUMENTS

| | | |
|---|---|---|
| CN | 101217535 A | 7/2008 |
| CN | 101577597 A | 11/2009 |

(Continued)

OTHER PUBLICATIONS

Extended European Search Report for Application No. 14810223.9 dated Nov. 17, 2016, 7 pages.

(Continued)

*Primary Examiner* — Michael C Lai
(74) *Attorney, Agent, or Firm* — Lowenstein Sandler LLP (57) ABSTRACT

Systems and methods are disclosed for providing supplemental content in relation to embedded media. In one implementation, a processing device receives a media request from a third-party platform to incorporate a first media item within the third-party platform. The processing device identifies one or more additional media items based on the media request. The processing device provides the first media item and one or more links to at least one of the one or more additional media items in relation to the third-party platform.

25 Claims, 6 Drawing Sheets

(56) References Cited

U.S. PATENT DOCUMENTS

| | | | | |
|---|---|---|---|---|
| 2012/0054369 | A1* | 3/2012 | Shafi | G06F 16/972 709/246 |
| 2012/0246240 | A1* | 9/2012 | Hanlon | G06F 16/48 709/206 |
| 2013/0080968 | A1* | 3/2013 | Hanson | G06F 3/0482 715/783 |
| 2013/0340011 | A1* | 12/2013 | Rodriguez | G06Q 30/02 725/62 |
| 2014/0245407 | A1* | 8/2014 | Vernal | G06F 21/41 726/5 |
| 2014/0279184 | A1* | 9/2014 | Lai | G06Q 30/0631 705/26.7 |

FOREIGN PATENT DOCUMENTS

| | | |
|---|---|---|
| CN | 201846449 U | 5/2011 |
| JP | 2004186830 A | 7/2004 |
| JP | 2009094980 A | 4/2009 |
| JP | 2009141952 A | 6/2009 |
| JP | 2010067080 A | 3/2010 |
| WO | 2011123720 A3 | 10/2011 |

OTHER PUBLICATIONS

International Searching Authority, "Notification of Transmittal of the International Search Report and the Written Opinion of the International Search Authority, or the Declaration," for International Application No. PCT/US2014/039241, dated Oct. 8, 2014, 5 pages.
Unknown. (May 22, 2018). oEmbed. Retrieved from https://oembed.com/. on May 22, 2018. 23 pages.
Unknown. (May 22, 2018). YouTube Embedded Players and Player Parameters. Retrieved from https://developers.google.com/youtube/player_parameters. on May 22, 2018. 17 pages.

* cited by examiner

PROVIDING SUPPLEMENTAL CONTENT IN RELATION TO EMBEDDED MEDIA

CROSS-REFERENCE TO RELATED APPLICATION

This continuation application claims priority to U.S. patent application Ser. No. 14/076,741, filed on Nov. 11, 2013, and entitled "Providing Supplemental Content In Relation To Embedded Media," now U.S. Pat. No. 9,787,783, which is related to and claims the benefit of U.S. Provisional Patent Application No. 61/833,407, filed Jun. 10, 2013, entitled "Video Player Embed With Related Videos," all of which are incorporated by reference herein.

TECHNICAL FIELD

Aspects and implementations of the present disclosure relate to data processing, and more specifically, to providing supplemental content in relation to embedded media.

BACKGROUND

Audio and video content can be stored on data servers and provided to users for listening/viewing over the Internet. Applications for supporting the listening/viewing of such audio and video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a media request from a third-party platform to incorporate a first media item within the third-party platform. The processing device identifies one or more additional media items based on the media request. The processing device provides the first media item and one or more links to at least one of the one or more additional media items in relation to the third-party platform.

In another aspect, a processing device receives, in relation to a third-party platform, a first media item and one or more links to one or more additional media items associated with the first media item. The processing device provides, in relation to the third-party platform, (a) the first media item and (b) at least one of the one or more links to one or more additional media items associated with the first media item

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to providing supplemental content in relation to embedded media. The systems and methods disclosed can be applied to media content such as audio and/or video content, images, and/or any other content that can be collected and/or disseminated such as via a media sharing service or website. More particularly, many social networking services enable users to 'share' or disseminate media items (such as streaming videos that are stored at a media sharing service) via links and/or embedded media players that can be incorporated within the social networking service (e.g., within a webpage or application associated with a particular social network). The sharing of such media items can be advantageous for both the media sharing service (by increasing viewership of the media items provided by the media sharing service) and for the social network (by increasing user engagement with the social network). However, while the media sharing service may also include additional media items that may be of interest to a viewer of media content, various constraints and limitations associated with the presentation of embedded media items within a social network (e.g., space constraints) can make it more difficult for the viewer to discover such additional content.

Accordingly, described herein in various embodiments are technologies that enable the providing of supplemental content in relation to embedded media. As described herein, upon receiving a request for a media item and determining that such a request originated from a social network (e.g., in relation to an embedded media item within a post on a social network), one or more additional media items stored in a media sharing service can be identified, and links to such media items can be provided within the social network in conjunction with the initially requested media item. In doing so, viewers of media content embedded within a social network can be exposed to additional media items that may be of interest, while also increasing user engagement with the social network.

Figure 1:
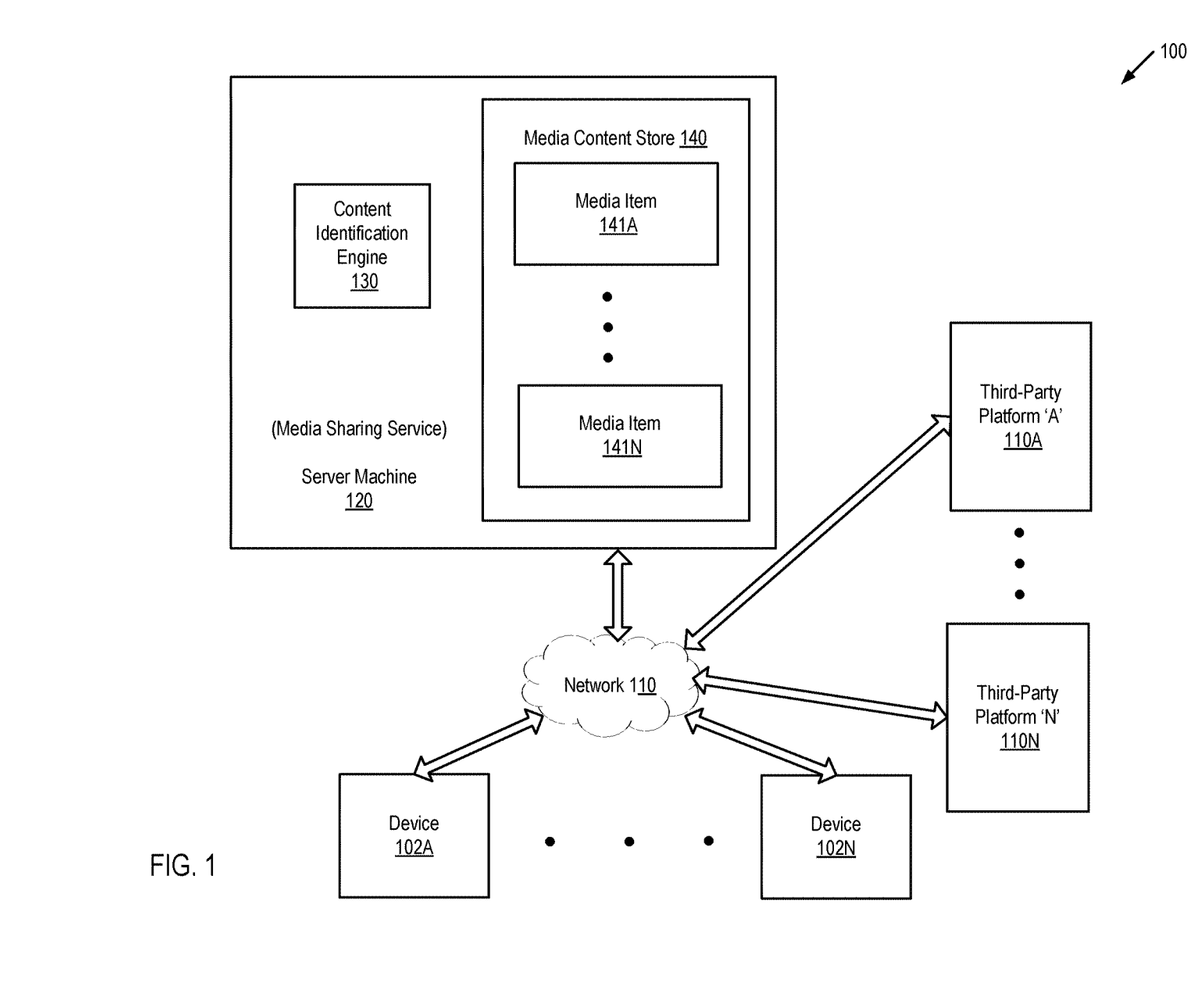
FIG. 1 depicts an illustrative system architecture, in accordance with one implementation of the present disclosure.

FIG. 1 depicts an illustrative system architecture 100, in accordance with one implementation of the present disclosure. The system architecture 100 includes user devices 102A-102N, third-party platforms 110A-110N and server machine 120. These various elements or components can be connected to one another via network 110, which can be a public network (e.g., the Internet), a private network (e.g., a local area network (LAN) or wide area network (WAN)), or a combination thereof.

User devices 102A-102N can be wireless terminals (e.g., smartphones, etc.), personal computers (PC), laptops, tablet computers, or any other computing or communication devices. The user devices 102A-102N may run an operating system (OS) that manages hardware and software of the user devices 102A-102N. Various applications, such as mobile applications ('apps'), web browsers, etc. (not shown) may run on the client machines (e.g., on the OS of the client machines). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the user device 102. The user devices 102A-102N can be geographically distributed anywhere throughout the world.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 120 can include components such as content identification engine 130, and media content store 140. The components can be combined together or separated in further components, according to a particular implementation. It should be noted that in some implementations, various components of server machine 120 may run on separate machines. Moreover, some operations of certain of the components are described in more detail below with respect to FIG. 2.

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Media content store 140 can include media items 141A-141N. In certain implementations, media items 141A-141N can correspond to media content itself (e.g., digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.) and can be provided, for example, by a media content provider. Moreover, in certain implementations, server machine 120 can be configured to allow viewers wishing to access or view such media items to do so via one or more webpages and/or applications provided by the media sharing service, and/or via one or more embedded media viewers that can be incorporated within other webpages and/or applications.

Third-party platforms 110A-110N can be one or more servers, computers, devices, data stores, networks, software components, and/or hardware components, etc., that provide a framework for services such as social networking services and/or any other such services that enable users to communicate, share information, and/or interact with one another.

In certain implementations, each platform can provide a website and/or an application that enables users to utilize the functionality provided by the platform. Additionally, the third party platform can present to a user a listing (e.g., activity feed, stream, wall, etc.) of objects (such as posts, content items (e.g., video, images, audio, etc.), status updates, favorability indications, tags, messages, and so on) generated by other users of the social network. The third party platform may also include a content sharing aspect that allows users to upload, view, tag, share or otherwise disseminate content such as text content, video content, image content, audio content, and so on to other users, such as by embedding such content within one or more pages or interfaces provided by the third-party platform, and/or by providing one or more links to such media items, such as within user posts, messages, etc. Other users of the third-party platform may comment on the shared content, discover new content, locate updates, share content, and otherwise interact with the provided content.

As described herein, a media request for a first media item 141 can be received from a third-party platform (e.g., a social network). In certain implementations, such operations can be performed by and/or in conjunction with content identification engine 130. Based on the media request, one or more additional media items can be identified, and the first media item and links to one or more of the identified additional media items can be provided in relation to the third-party platform such as by and/or in conjunction with content identification engine 130, as described herein.

Figure 2:
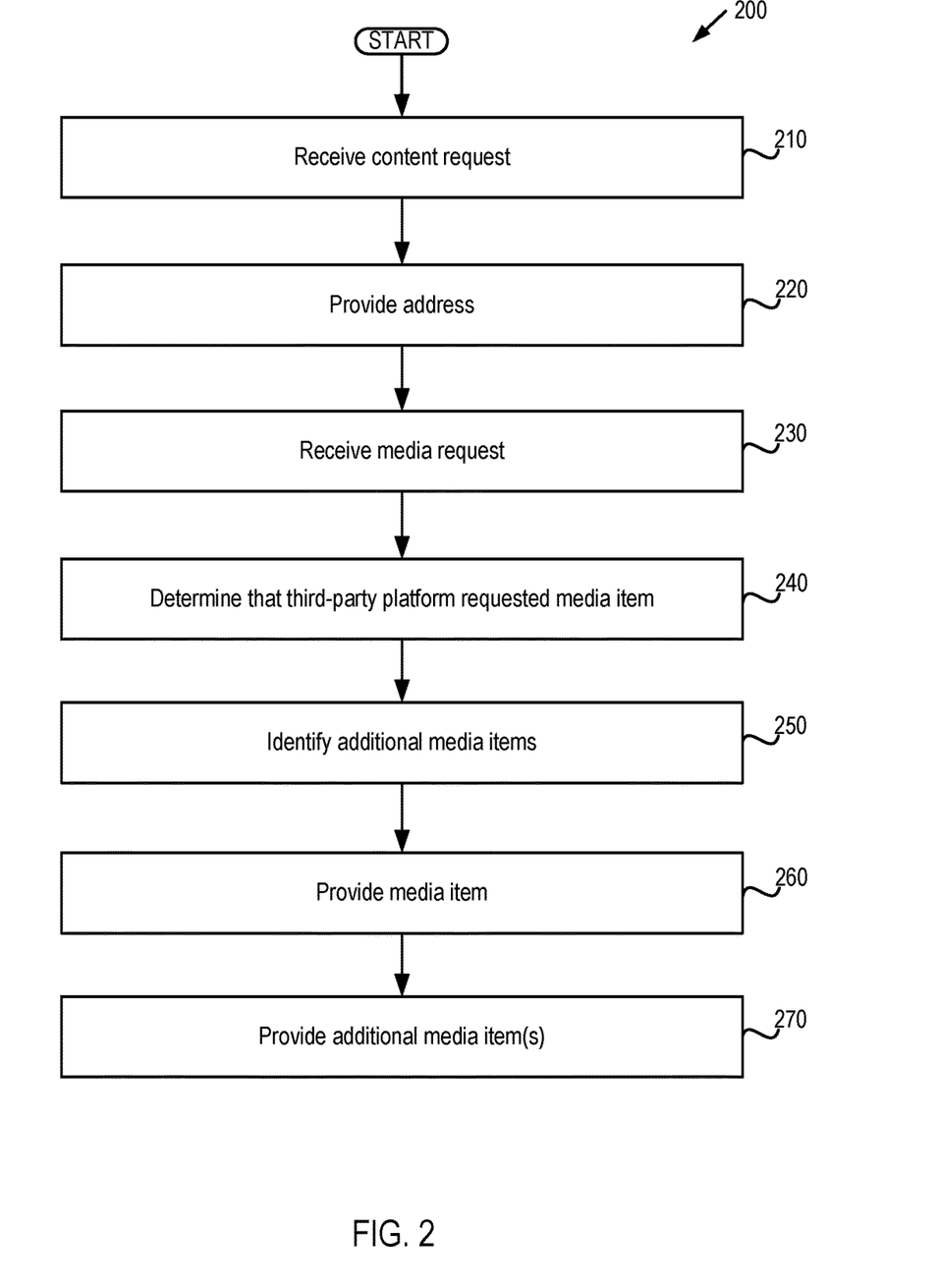
FIG. 2 depicts a flow diagram of aspects of a method for providing supplemental content in relation to embedded media.

FIG. 2 depicts a flow diagram of aspects of a method 200 for providing supplemental content in relation to embedded media. The method is performed by processing logic that may comprise hardware (circuitry, dedicated logic, etc.), software (such as is run on a general purpose computer system or a dedicated machine), or a combination of both. In one implementation, the method is performed by server machine 120 of FIG. 1, while in some other implementations, one or more blocks of FIG. 2 may be performed by another machine. For example, in various alternative implementations, the method can be performed at a social network 110 and/or a user device 102 (i.e., the method or various aspects thereof can be performed locally at the third-party platform 110 and/or device 102 rather than in communication with a server such as server machine 120).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 3:
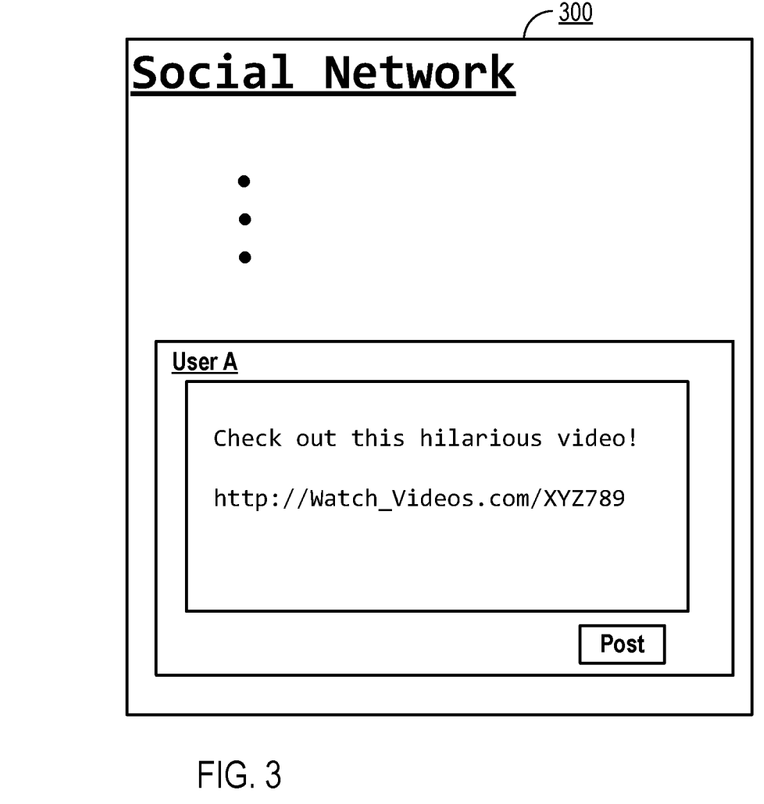
FIG. 3 depicts an exemplary user interface of a third-party platform, in accordance with one implementation of the present disclosure.

At block 210, a content request can be received. In certain implementations such a content request (e.g., a request to incorporate a media item within a third-party platform) can be received from a third-party platform such as a social network. Moreover, in certain implementations such a content request can be for a content page. For example, a user utilizing a website, service, or application associated with a particular social network can 'share,' disseminate, or otherwise provide a uniform resource locator (URL) that corresponds to a content page provided by a media sharing service. Such a content page can include and/other otherwise be associated with, for example, a media item (e.g., a video), metadata pertaining to the media item (e.g., a description of the media item, category information, author information, comments, etc.), and/or an address of the media item (e.g., a hyperlink directing to the location of the media item itself). For example, FIG. 3 depicts a user interface 300 of a webpage or application (e.g., a mobile app) corresponding to a third-party platform such as a social networking service ('Social Network') in which a user has input a message or 'post' ("Check out . . . ") that includes a hyperlink ("http:Watch_Videos.com/XYZ789") to a webpage provided by a media sharing service. As noted, the webpage to which such a hyperlink corresponds can include, for example, a media item, such as a video (as well as controls that enable a user to view/interact with the video), metadata pertaining to the video (e.g., a description, category information, author information, comments, etc.), and/or an address of the media item itself (e.g., a hyperlink directing to the location of the media item itself as stored in media content store 140). Accordingly, in certain implementations, upon receiving (such as at a third-party platform, e.g., Third-Party Platform 'A' 110A as shown in FIG. 1) a post (e.g., as input by a user) that includes a hyperlink to a webpage (such as is shown in FIG. 3), the third-party platform can be configured to generate and/or provide a content request (e.g., a request for a media item that corresponds to the hyperlink within the post, e.g., media item 141A), and such a content request can be received (e.g., by server machine 120). In one aspect, block 210 is performed by content identification engine 130.

At block 220, an address can be provided in response to the request. In certain implementations such an address can include an address of a media item (such as media item 141A, as described in relation to block 210). That is, in response to the content request received at block 210 (e.g., a request originating at a third-party platform for a media item that corresponds to the hyperlink included within a post, e.g., media item 141A), an address of a media item (e.g., a hyperlink to the location of the media item itself) can be provided. For example, in the scenario illustrated in FIG. 3, a hyperlink directing to the location of a media item stored in media content store 140 can be provided. In certain implementations, such a hyperlink can be referred to an "embed URL," and correspond to the location of the media item to be referenced when embedding media within a third-party platform. Moreover, in certain implementations such a hyperlink can be incorporated within a third-party platform (for example, in lieu of the hyperlink originally provided by the user when composing the post within the third-party platform—e.g., 'http://Watch_Videos.com/XYZ789' as depicted in FIG. 3, which, as noted, corresponds to a webpage of a media sharing service that incorporates the media item itself) such as in conjunction with a thumbnail or other such representation of a media item. Upon selection of such a thumbnail/representation, the media item itself can be retrieved and provided within the platform (e.g., within a media player embedded within the platform, such as within a social media post or message), such as in the manner described herein. In one aspect, block 220 is performed by content identification engine 130.

At block 230, a media request is received. In certain implementations such a media request is received from a third-party platform. Moreover, in certain implementations such a media request is for a first media item. For example, when a user selects a thumbnail or other such representation of a media item provided within a third-party platform (e.g., within a post provided on a social network), a media request for the media item itself can be provided to and received by a media sharing service (e.g., server machine 120). Moreover, in certain implementations such a media request can include an address of the first media item (such as the address provided at block 220). As noted, such a media request can be initiated, for example, when a user selects (e.g., clicks on, taps on, etc.) a thumbnail or other such representation of the selected media item. For example, in the scenario illustrated in FIG. 3, a request for a media item stored in media content store 140 can be provided. Such a media request can incorporate the address provided at 220, which, as noted, corresponds to the location of the media item itself in media content store 140. In one aspect, block 230 is performed by content identification engine 130.

At block 240, it can be determined that the third-party platform has requested the first media item. That is, having received (such as at block 230) a media request, one or more aspects of the media request can be processed and/or analyzed to determine, for example, that the request originated from the third-party platform (e.g., in relation to the embedding of a media item within a social networking post). Such a determination can be made, for example, based on the IP address from which the request is received (e.g., from a server associated with the third-party platform), such as based on an association that can be identified between the IP address and the third-party platform. In one aspect, block 240 is performed by content identification engine 130.

Figure 4:
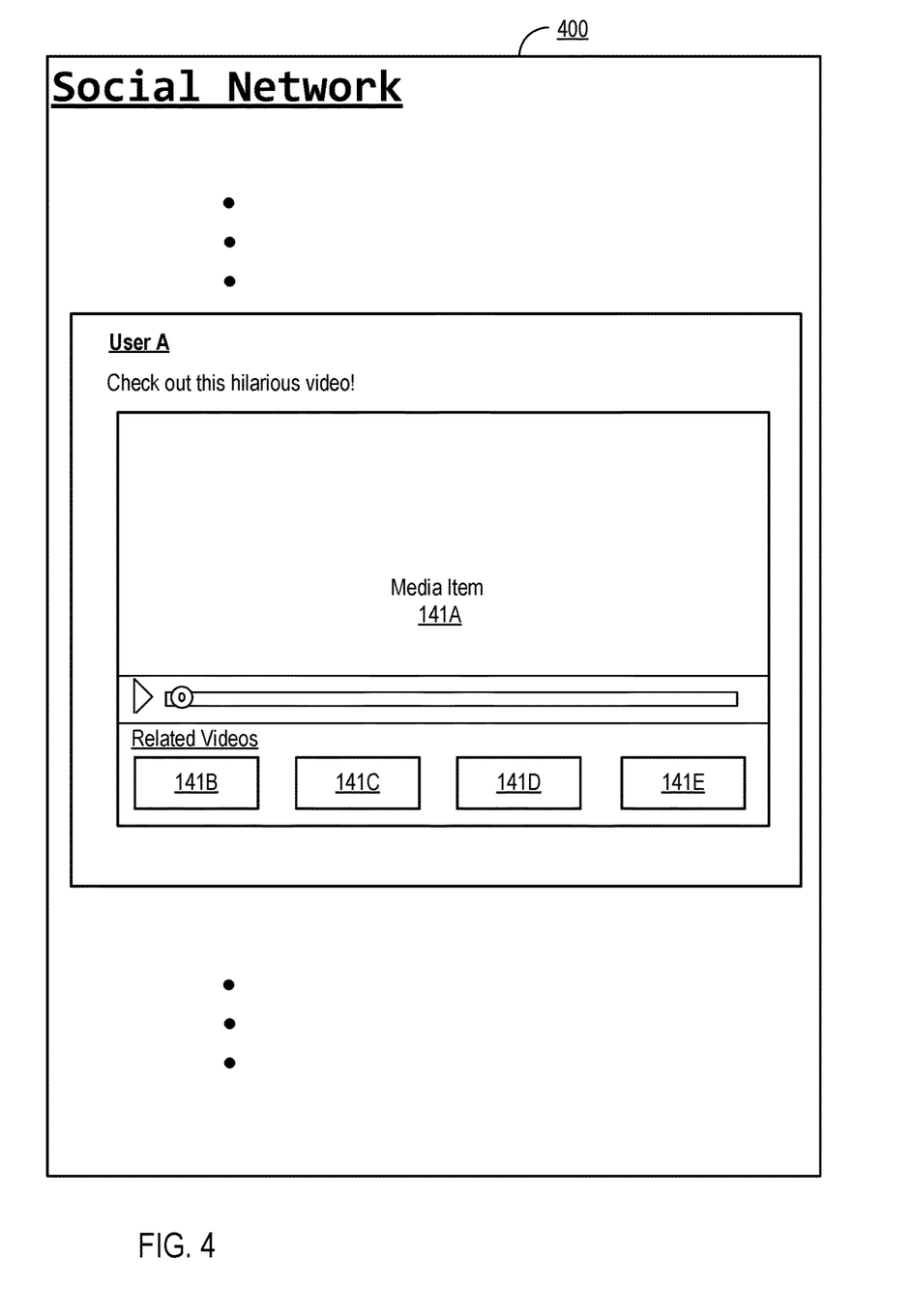
FIG. 4 depicts an exemplary user interface of a third-party platform, in accordance with one implementation of the present disclosure.

At block 250, one or more additional media items can be identified. That is, having received (such as at block 230) a media request originating from a third-party platform (e.g., a request to embed a media item within a social network), one or more additional media items (such as from among those media items stored in media content store 140) can be identified. For example, FIG. 4 depicts a user interface 400 of a webpage or application (e.g., a mobile app) corresponding to a third-party platform such as a social networking service ('Social Network') in which several additional media items 141B-141E have been identified (and subsequently provided, as described herein) in relation to media item 141A embedded within the third-party platform. In one aspect, block 250 is performed by content identification engine 130.

In certain implementations such additional media items can be identified based on a media request (such as the media request received at 230). Moreover, in certain implementations additional media items that are selected subsequent to a selection of the first media item can be identified. For example, one or more additional media items that have been previously observed (e.g., by a media sharing service) to be viewed by one or more users subsequent to viewing the media item that was initially embedded within the third-party platform can be identified. By way of illustration and with reference to FIG. 4, based on a determination that media items 141B, 141C, 141D, and/or 141E were viewed by one or more users subsequent to viewing media item 141A (that is, the media item that was initially embedded within the third-party platform) (as can be determined, for example, by content identification engine 130, such as based on one or more viewing histories and/or records, such as can be stored in and/or associated with media content store 140), such media items 141B-141E can be identified as additional media items with respect to media item 141 (and can be presented and/or provided in conjunction with media item 141A, such as is depicted in FIG. 4 and described herein).

Being that such additional media items (e.g., media items 141B-141E) can be determined to have been viewed (such as by other viewers) subsequent to viewing the initially embedded media item, such additional media items may also be of interest to a viewer of the media item that was initially embedded within the third-party platform (e.g., media item 141A).

It should be noted that in situations in which the systems discussed herein collect personal information about users, or may make use of personal information, the users may be provided with an opportunity to control whether programs or features collect user information (e.g., information about a user's media viewing history, interests, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Additionally, additional media items that are selected by users that selected the first media item can be identified. That is, for example, based on one more viewing histories (as can be maintained, for example, by a media sharing service), one or more media items that have been viewed by other viewers of the first media item (e.g., the media item embedded within the third-party platform) (and, in certain implementations, which have also not been viewed by the user currently viewing the media item embedded within the third-party platform) can be identified. By way of illustration and with reference to FIG. 4, based on a determination that media items 141B, 141C, 141D, and/or 141E were viewed by users who also viewed media item 141A, such media items 141B-141E can be identified as additional media items with respect to media item 141 (and can be presented and/or provided in conjunction with media item 141A, such as is depicted in FIG. 4 and described herein). Being that such additional media items (e.g., media items 141B-141E) can be determined to have been viewed by other viewers who also viewed the initially embedded media item (e.g., media item 141A), such additional media items may also be of interest to a viewer of the media item that was initially embedded within the third-party platform (e.g., media item 141A).

Moreover, in certain implementations additional media items that are selected in relation to the third-party platform (such as the third-party platform from which a content request was received as described at block 210) can be identified. That is, having received (such as at block 230) a media request originating from a third-party platform (e.g., a request to embed a media item within a social network), one or more additional media items that have also been embedded within the same third-party platform can be identified (for example, by content identification engine 130, such as based on one or more histories or records, such as can be stored in and/or associated with media content store 140). By way of illustration and with reference to FIG. 4, based on a determination that media items 141B, 141C, 141D, and/or 141E were also embedded within the same third-party platform ('Social Network'), such media items 141B-141E can be identified as additional media items with respect to media item 141 (and can be presented and/or provided in conjunction with media item 141A, such as is depicted in FIG. 4 and described herein). Being that such additional media items (e.g., media items 141B-141E) can be determined to have been embedded elsewhere within the same third-party platform, such additional media items may also be of interest to a viewer of the media item (e.g., media item 141A) also embedded within the third-party platform.

Additionally, in certain implementations additional media items that have been selected by users of the third-party platform that are associated with the first user can be identified in relation to a first user of the third-party platform. That is, it can be appreciated that many social networks enable users to establish connections between one another (indicating that such users correspond, for example, to a user's 'friends,' 'contacts,' 'followers,' etc.). Accordingly, having received a media request originating from a third-party platform with respect to one user, one or more additional media items that have also been embedded within the same third-party platform with respect to other users that are associated with the user can be identified. By way of illustration and with reference to FIG. 4, based on a determination that media items 141B, 141C, 141D, and/or 141E were viewed by users of the third-party platform that are associated with (e.g., are 'friends' or 'contacts' of) the user that embedded media item 141A within the third-party platform (e.g., 'User A,' as shown in FIG. 4), such media items 141B-141E can be identified as additional media items with respect to media item 141 (and can be presented and/or provided in conjunction with media item 141A, such as is depicted in FIG. 4 and described herein). Being that such additional media items (e.g., media items 141B-141E) can be determined to have been viewed by other viewers who are associated with the user that provided the initially embedded media item (e.g., media item 141A), such additional media items (e.g., media items 141B-141E) may also be of interest to a viewer of the media item that was initially embedded within the third-party platform (e.g., media item 141A).

At block 260, a media item (e.g., the media item with respect to which a media request is received, such as is described at block 230) and/or one or more links to one or more additional media items can be provided. In certain implementations such a first media item and/or links to one or more additional media items can be provided in relation to a third-party platform (such as the third-party platform from which a content request was received as described at block 210). For example, as shown in FIG. 4, links to and/or thumbnails of additional media items ('related videos' 141B-141E) can be provided within a player configured to play media item 141A and/or can be provided proximate to a player configured to play media item 141A, such as is described herein. Moreover, in certain implementations additional descriptions of the additional media items 141B-141E can also be provided and displayed, for example, when a user mouses over (or otherwise focuses on) the thumbnail for the related video. In one aspect, block 260 is performed by content identification engine 130.

Moreover, in certain implementations a link to the first media item can be provided based on a determination that the third-party platform has requested the first media item (as determined, for example, at block 240). Such a link to the first media item can include one or more elements that correspond to at least one of the additional media items. That is, in certain implementations the media item with respect to which a media request is received, and links to one or more additional media items can be provided to the third-party platform (such as from media sharing service 120) by way of a link that contains elements that correspond to the requested media item and the additional media items (e.g., a hyperlink to the first media item that includes encrypted components that correspond to the various additional media items). Incorporating such a link within a third-party platform can enable the embedding of the first media item and links to one or more additional media items, such as is depicted in FIG. 4 and described herein.

Additionally, in certain implementations a link to the first media item that includes one or more elements that correspond to one or more of the additional media items can be provided. That is, in certain implementations the media item with respect to which a media request is received, and links to one or more additional media items can be provided to the third-party platform (such as from media sharing service 120) by way of a link that contains elements that correspond to the requested media item and the additional media items (e.g., a hyperlink to the first media item that includes encrypted components that correspond to the various additional media items). Incorporating such a link within a third-party platform can enable the embedding of the first media item and links to one or more additional media items, such as is depicted in FIG. 4 and described herein.

Figure 5A:
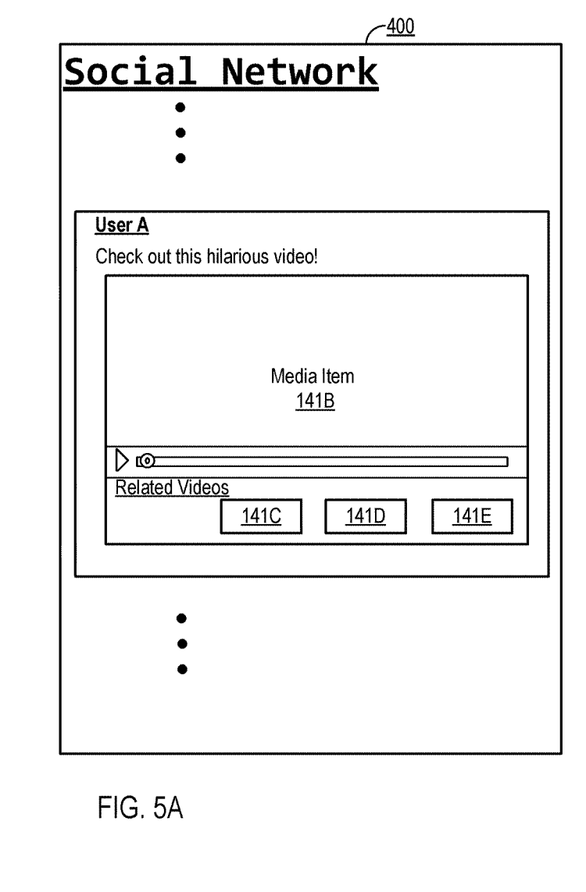
FIG. 5A depicts an exemplary user interface of a third-party platform, in accordance with one implementation of the present disclosure.

At block 270, one or more additional media items can be provided. In certain implementations such additional media items can be provided in response to a selection of one or more links (e.g., by clicking on or otherwise selecting one or more of additional media items 141B-141E as shown in FIG. 4). Moreover, in certain implementations the first media item can be substituted with one of the additional media items, such as in response to a selection of one of the links. For example, FIG. 5A depicts a user interface 400 of a webpage or application (e.g., a mobile app) corresponding to a third-party platform such as a social networking service ('Social Network') in which media item 141B (which was previously provided as a link to an additional media item with respect to media item 141A, as shown in FIG. 3) is selected and thereby substitutes media item 141A within the embedded player/location within interface 400.

Figure 5B:
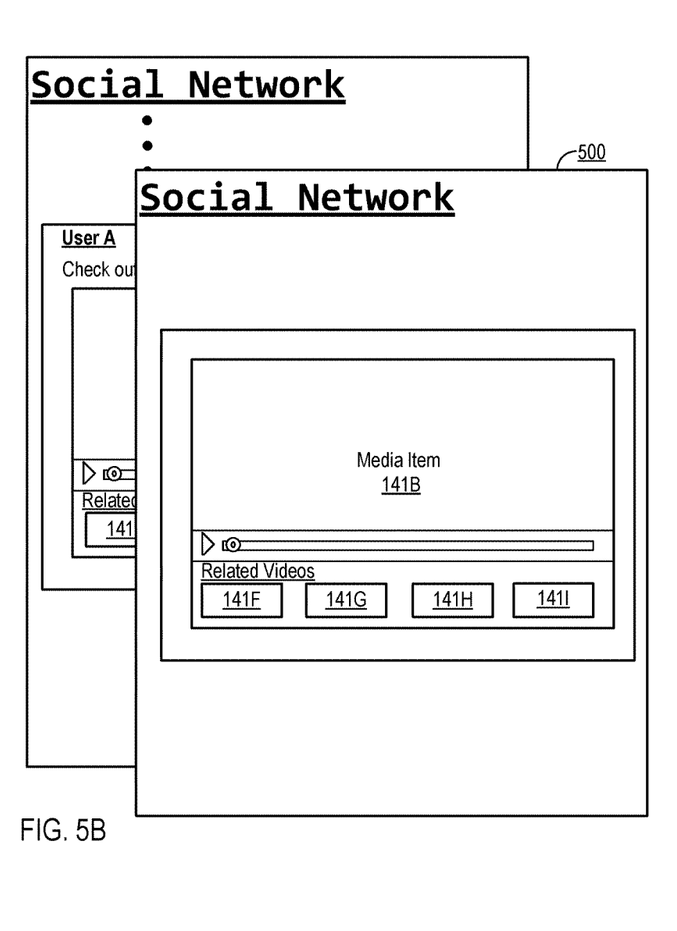
FIG. 5B depicts an exemplary user interface of a third-party platform, in accordance with one implementation of the present disclosure.

Additionally, in certain implementations, in response to a selection of one of the links (e.g., links to the additional media items provided with respect to an embedded media item), one or more of the additional media items can be provided in parallel to the first media item. For example, FIG. 5B depicts a scenario whereby a link to an additional media item (e.g., media item 141B as shown in FIG. 4) is selected by a user, resulting in a new or additional user interface 500 being generated incorporating the selected media item 141B (e.g., within a separate tab, window, screen, interface, etc.). It should be noted that in this (and other) scenarios, one or more additional media items (here, media items 141F-141I) can be identified and provided with respect to the selected media item (here, media item 141B), such as using one or more of the techniques described herein. In other implementations, in response to a selection of one of the links (e.g., links to the additional media items provided with respect to an embedded media item), one or more of the additional media items can be provided in new or additional interface (e.g., in a separate tab, window, screen, interface, etc., such as in a manner known to those of ordinary skill in the art) provided by a media sharing service in relation to media item 141B. In one aspect, block 270 is performed by content identification engine 130.

Figure 6:
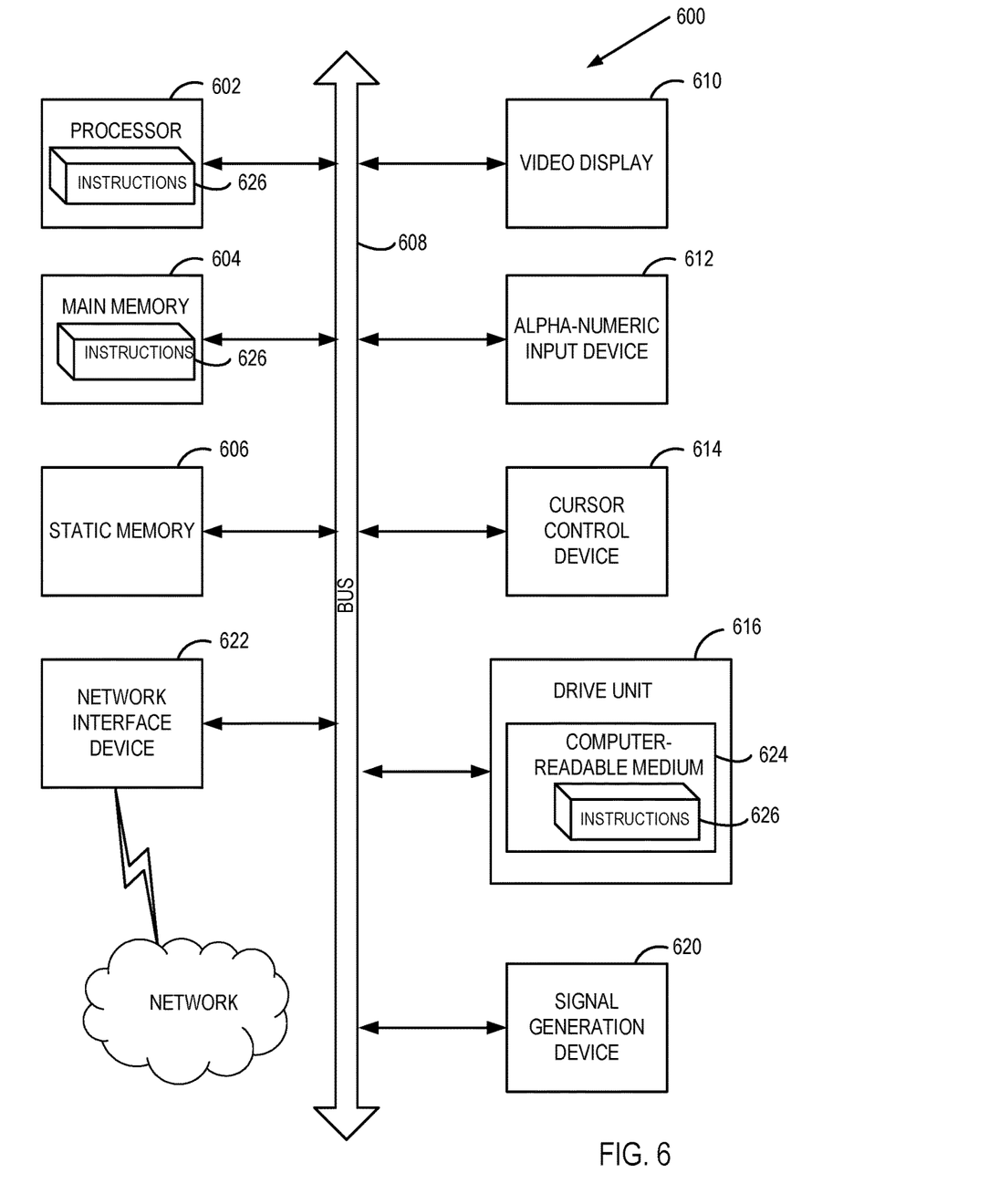
FIG. 6 depicts a block diagram of an illustrative computer system operating in accordance with aspects and implementations of the present disclosure.

FIG. 6 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
  receiving, at a social network platform, a selection of a representation of a media item within a social media post that is presented to a first user;
  sending, from the social network platform, a media request pertaining to the media item to a media sharing system;
  receiving, at the social network platform, the media item and one or more representations of one or more additional media items that are identified as being of interest to the first user from the media sharing system; and presenting, by the social network platform to the first user, the media item in a media player within the social media post, together with the one or more representations of the one or more additional media items that are displayed proximate to the media item being presented in the social media post.

2. The method of claim 1, wherein the one or more additional media items are presented within the media player playing the media item or proximate to the media player playing the media item.

3. The method of claim 1, wherein the media sharing system is separate from the social network platform.

4. The method of claim 1, wherein receiving, at the social network platform, the media item and the one or more representations of the one or more additional media items from the media sharing system further comprises receiving a link to the media item, wherein the link to the media item comprises one or more elements corresponding to at least one of the one or more additional media items.

5. The method of claim 1, further comprising:
  receiving, at the social network platform, a selection of one of the one or more representations of the one or more additional media items;
  sending the selection to the media sharing system;
  receiving, from the media sharing system, a subsequent representation of a subsequent media item; and
  presenting the subsequent representation within the media player or proximate to the media player within the social media post.

6. The method of claim 1, further comprising:
  receiving, at the social network platform, a selection of one of the one or more representations of the one or more additional media items; and
  substituting, in the media player within the social media post of the social network platform, the media item with the at least one of the one or more additional media items associated with the selected representation.

7. The method of claim 1, further comprising:
  receiving, at the social network platform, a selection of one of the one or more representations; and
  causing, by the social network platform, an additional media item associated with the selected representation to be presented in parallel to the first media item.

8. The method of claim 1, wherein the one or more additional media items have been identified as being selected by one or more users subsequent to a selection of the media item.

9. The method of claim 1, wherein the one or more additional media items have been identified as being selected by one or more users that selected the media item.

10. The method of claim 1, wherein the one or more additional media items have been identified as being selected in relation to the social network platform.

11. A system comprising:
a memory storing a social network platform; and
a processing device communicating with the memory to execute the social network platform to:
receive a selection of a representation of a media item within a social media post that is presented to a first user;
send a media request pertaining to the media item to a media sharing system;
receive the media item and one or more representations of one or more additional media items that are identified as being of interest to the first user from the media sharing system; and
present to the first user the media item in a media player within the social media post, together with the one or more representations of the one or more additional media items that are displayed proximate to the media item being presented in the social media post.

12. The system of claim 11, wherein the processing device is further to:
receive a selection of one of the one or more representations of the one or more additional media items;
send the selection to the media sharing system;
receive, from the media sharing system, a subsequent representation to a subsequent media item; and
present the subsequent representation within the media player or proximate to the media player within the social media post.

13. The system of claim 11, wherein the processing device is further to:
receive a selection of one of the one or more representations of the one or more additional media items; and
substitute, in the media player within the social media post of the social network platform, the media item with the at least one of the one or more additional media items associated with the selected representation.

14. The system of claim 11, wherein the processing device is further to:
receive a selection of one of the one or more representations; and
cause an additional media item associated with the one of the one or more representations that is selected to be presented in parallel to the media item.

15. The system of claim 11, wherein the media sharing system is separate from the social network platform.

16. The system of claim 11, wherein the one or more additional media items are presented within the media player playing the media item or proximate to the media player playing the media item.

17. A method comprising:
receiving, at a media sharing system, a media request from a social network platform to present a first media item in a social media post of the social network platform that is separate from the media sharing system;
identifying, by a processing device at the media sharing system, one or more additional media items based on the media request originating from the social network platform; and
providing, from the media sharing system, one or more representations of the one or more additional media items in conjunction with the first media item for presentation of the first media item with the one or more representations of the one or more additional media items in the social media post of the social network platform, wherein the first media item is to be presented in a media player within the social media post and the one or more representations of the one or more additional media items are to be presented proximate to the first media item within the media player in the social media post.

18. The method of claim 17, wherein identifying the one or more additional media items comprises identifying the one or more additional media items that are selected subsequent to a selection of the first media item.

19. The method of claim 17, wherein identifying the one or more additional media items comprises identifying the one or more additional media items that are selected by users that selected the first media item.

20. The method of claim 17, wherein identifying the one or more additional media items comprises identifying the one or more additional media items that are selected in relation to the social network platform.

21. A non-transitory machine-readable storage medium storing instructions which, when executed by a processing device, cause the processing device to perform operations comprising:
receiving, at a social network platform, a selection of a representation of a media item within a social media post that is presented to a first user;
sending, from the social network platform, a media request pertaining to the media item to a media sharing system;
receiving, at the social network platform, the media item and one or more representations of one or more additional media items that are identified as being of interest to the first user from the media sharing system; and
presenting, by the social network platform to the first user, the media item in a media player within the social media post, together with the one or more representations of the one or more additional media items that are displayed proximate to the media item being presented in the social media post.

22. The non-transitory machine-readable storage medium of claim 21, wherein the one or more additional media items are presented within the media player playing the media item or proximate to the media player playing the media item.

23. The non-transitory machine-readable storage medium of claim 21, wherein receiving, at the social network platform, the media item and the one or more representations of the one or more additional media items from the media sharing system further comprises receiving a link to the media item, wherein the link to the media item comprises one or more elements corresponding to at least one of the one or more additional media items.

24. A non-transitory machine-readable storage medium storing instructions which, when executed, cause a processing device to perform operations comprising:
receiving, at a media sharing system, a media request from a social network platform to present the media item in a social media post of the social network platform that is separate from the media sharing system;

identifying, by a processing device at the media sharing system, one or more additional media items based on the media request originating from the social network platform; and providing, from the media sharing system, one or more representations of the one or more additional media items in conjunction with the media item for presentation of the media item with the one or more representations of the one or more additional media items in the social media post of the social network platform, wherein the media item is to be presented in a media player within the social media post and the one or more representations of the one or more additional media items are to be presented proximate to the media item within the media player in the social media post.

25. The non-transitory machine-readable storage medium of claim 24, wherein identifying the one or more additional media items comprises identifying the one or more additional media items that are selected subsequent to a selection of the media item.

* * * * *